United States Patent
Kroupa

(10) Patent No.: US 9,066,181 B2
(45) Date of Patent: Jun. 23, 2015

(54) INTERCHANGEABLE ATTACHABLE EXTENDABLE AND RETRACTABLE EARPIECE CABLE ASSEMBLY FOR MOBILE COMMUNICATION AND SOUND DEVICES

(71) Applicant: Robert J Kroupa, Chicago, IL (US)

(72) Inventor: Robert J Kroupa, Chicago, IL (US)

( * ) Notice: Subject to any disclaimer, the term of this patent is extended or adjusted under 35 U.S.C. 154(b) by 0 days.

(21) Appl. No.: 14/055,610

(22) Filed: Oct. 16, 2013

(65) Prior Publication Data

US 2014/0105441 A1 Apr. 17, 2014

Related U.S. Application Data

(63) Continuation of application No. 13/369,580, filed on Feb. 9, 2012.

(60) Provisional application No. 61/715,098, filed on Oct. 17, 2012.

(51) Int. Cl.
  *H04R 1/10* (2006.01)
  *B65H 75/44* (2006.01)
  *H02G 11/02* (2006.01)

(52) U.S. Cl.
  CPC .......... *H04R 1/1033* (2013.01); *B65H 75/4434* (2013.01); *H02G 11/02* (2013.01); *B65H 2701/3919* (2013.01)

(58) Field of Classification Search
  USPC ............. 191/12.4, 12.2 R; 381/370; 242/378, 242/370, 375; 455/569.1, 575.2, 351, 455/575.8; 174/53; 361/755, 826
  See application file for complete search history.

(56) References Cited

U.S. PATENT DOCUMENTS

| | | |
|---|---|---|
| 5,044,981 A | 9/1991 | Suffi |
| 5,253,292 A | 10/1993 | Fluder et al. |
| 5,664,868 A | 9/1997 | Montalbano |
| 6,170,775 B1 | 1/2001 | Kovacik et al. |
| 6,273,354 B1 | 8/2001 | Kovacik et al. |
| 6,616,080 B1 | 9/2003 | Edwards |
| 6,633,770 B1 | 10/2003 | Gitzinger et al. |
| 6,644,582 B1 | 11/2003 | Liao |
| D484,874 S | 1/2004 | Chang et al. |
| 6,701,159 B1 | 3/2004 | Powell |
| 6,731,956 B2 | 5/2004 | Hanna et al. |
| 6,763,111 B2 | 7/2004 | Liao |
| 7,032,728 B2 | 4/2006 | Harcourt |
| 7,151,912 B1 | 12/2006 | Morrison |
| 7,257,422 B2 | 8/2007 | Loprete |
| 7,286,789 B2 | 10/2007 | Umezawa |
| D565,291 S | 4/2008 | Brandenburg et al. |
| D574,819 S | 8/2008 | Andre et al. |

(Continued)

FOREIGN PATENT DOCUMENTS

DE 29918357 10/1999
GB 2316300 2/1998

*Primary Examiner* — Hung S Bui
*Assistant Examiner* — Michael Matey
(74) *Attorney, Agent, or Firm* — Cook Alex Ltd.

(57) ABSTRACT

An interchangeable, extendable and retractable audio earpiece cable assembly for a mobile electronic or sound device having an audio output port. A protective casing assembly is adapted to attach to the mobile communication or sound device. A platform assembly having a cable reel housing is removably attached to the protective casing assembly. A cable attached at one end to an earpiece retractably extends from the cable reel housing at another end.

17 Claims, 13 Drawing Sheets

(56) References Cited

U.S. PATENT DOCUMENTS

| | | |
|---|---|---|
| D575,056 S | 8/2008 | Tan |
| D581,151 S | 11/2008 | Aipa |
| 7,478,776 B2 | 1/2009 | Salentine et al. |
| D587,896 S | 3/2009 | Aipa |
| 7,539,302 B2 | 5/2009 | Kulas |
| 7,612,997 B1 | 11/2009 | Diebel et al. |
| D606,751 S | 12/2009 | Andre et al. |
| 7,648,027 B2 | 1/2010 | Lin et al. |
| 7,699,198 B2 | 4/2010 | Sirichai et al. |
| D621,822 S | 8/2010 | Richardson et al. |
| D622,716 S | 8/2010 | Andre et al. |
| 7,782,610 B2 | 8/2010 | Diebel et al. |
| D624,910 S | 10/2010 | Richardson et al. |
| 7,933,122 B2 | 4/2011 | Richardson et al. |
| D644,636 S | 9/2011 | Richardson et al. |
| D645,031 S | 9/2011 | Richardson et al. |
| 8,016,107 B2 | 9/2011 | Emsky |
| 8,204,561 B2 | 6/2012 | Mongan et al. |
| 8,245,842 B2 | 8/2012 | Bau |
| D667,823 S | 9/2012 | Merenda |
| 8,367,235 B2 | 2/2013 | Huang |
| 8,439,191 B1 | 5/2013 | Lu |
| 8,457,701 B2 | 6/2013 | Diebel |
| 8,485,404 B2 | 7/2013 | Monaco et al. |
| 8,579,172 B2 | 11/2013 | Monaco et al. |
| 2001/0035242 A1 | 11/2001 | Hughs et al. |
| 2002/0126837 A1 | 9/2002 | Dowsett |
| 2002/0193151 A1 | 12/2002 | Edreich |
| 2003/0060241 A1 | 3/2003 | Loprete |
| 2003/0157973 A1 | 8/2003 | Yang |
| 2003/0165237 A1 | 9/2003 | Farr et al. |
| 2004/0077382 A1 | 4/2004 | Verity |
| 2004/0203521 A1 | 10/2004 | Nassimi |
| 2004/0204165 A1 | 10/2004 | Huang |
| 2004/0256188 A1* | 12/2004 | Harcourt .................. 191/12.2 A |
| 2005/0116684 A1* | 6/2005 | Kim .............................. 320/114 |
| 2005/0255898 A1 | 11/2005 | Huang |
| 2006/0058081 A1 | 3/2006 | Reichenbach |
| 2006/0287006 A1 | 12/2006 | McIntyre et al. |
| 2007/0165371 A1 | 7/2007 | Brandenburg |
| 2007/0293288 A1 | 12/2007 | Lin et al. |
| 2008/0009329 A1 | 1/2008 | Adler |
| 2008/0053852 A1 | 3/2008 | Ko et al. |
| 2008/0080732 A1* | 4/2008 | Sneed .......................... 381/374 |
| 2008/0232089 A1 | 9/2008 | Riccardi |
| 2009/0186264 A1 | 7/2009 | Huang |
| 2010/0200456 A1 | 8/2010 | Parkinson |
| 2011/0130174 A1 | 6/2011 | Kroupa |
| 2011/0203954 A1* | 8/2011 | Kroupa ........................ 206/320 |
| 2011/0233078 A1* | 9/2011 | Monaco et al. ............. 206/223 |
| 2012/0153065 A1 | 6/2012 | Fischer ........................ 242/379 |
| 2012/0314351 A1* | 12/2012 | Kroupa .................... 361/679.01 |
| 2013/0029725 A1* | 1/2013 | Heil-Brice et al. ............ 455/557 |
| 2013/0083456 A1* | 4/2013 | Koenig et al. ............ 361/679.01 |
| 2013/0188820 A1* | 7/2013 | McLaughlin ................. 381/384 |
| 2013/0208937 A1* | 8/2013 | Stern et al. ................... 381/332 |
| 2013/0237290 A1* | 9/2013 | Simmons et al. .......... 455/569.1 |

* cited by examiner

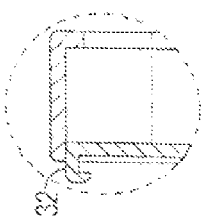
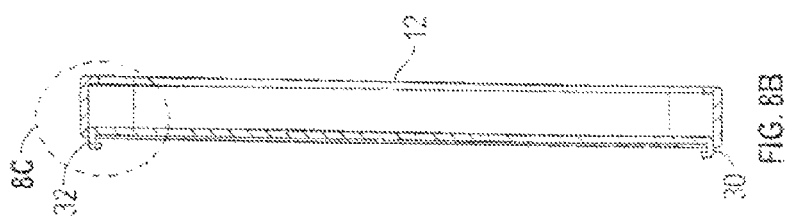
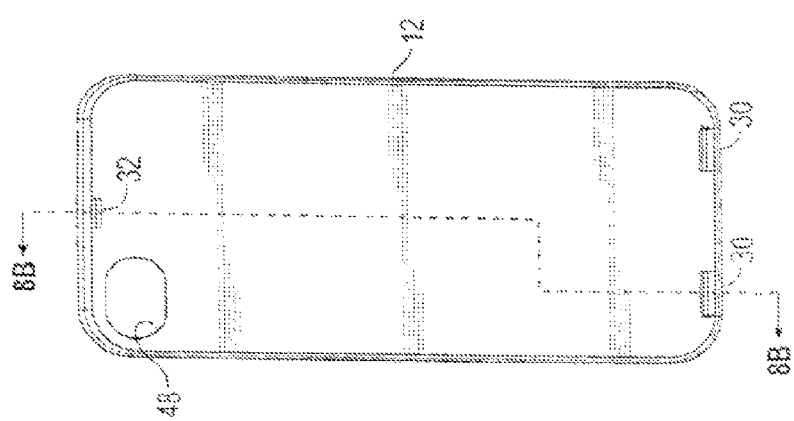

INTERCHANGEABLE ATTACHABLE EXTENDABLE AND RETRACTABLE EARPIECE CABLE ASSEMBLY FOR MOBILE COMMUNICATION AND SOUND DEVICES

This application claims priority to provisional application Ser. No. 61/715,098 filed Oct. 17, 2012 to the extent allowed by law, and is a continuation-in-part of non-provisional patent application Ser. No. 13/369,580 filed Feb. 9, 2012.

BACKGROUND OF THE INVENTION

1. Field of the Invention

The present invention relates generally to extendable and retractable earpieces for mobile electronic devices, such as mobile sound and communication devices, and more particularly to embodiments of an extendable and retractable earpiece assembly that is permanently attached to a casing and platform assembly, the platform assembly being removably attached to and/or interchangeable between various mobile electronic devices.

2. Description of the Prior Art

Portable sound and communication electronic devices deliver sound waves through either a built in speaker unit, or a pair of earpieces or an audio headset adapted to be electrically connected to and removed from the device. While a speaker is a practical feature for a portable communication device, portable sound systems designed to deliver a user's musical selections over a period of time generally require connection of a headset's earpieces, or earpieces per se, to the portable device through a plurality of cables, or a single cable, to convey the sound to the user in private, and without disturbing those near the user. Also, many portable electronic communication devices that have a built-in speaker system also have an audio output port or socket for receiving an earpiece connection jack plug, where the jack plug is normally attached to a cable or cables.

Currently, most if not all portable sound devices, and many portable communication devices, are used with headsets or earpieces attached to wires or cables. For example, portable communication device users rely on headsets or earpieces for convenience in multi-tasking. Such headsets and earpieces, and associated wires and cables, however, when not in use, extend and freely dangle from the mobile device and the earpieces or headset, allowing the wires, headset and/or earpieces to become ensnared on a nearby object, such as the user's clothing, and to rip out of the device causing damage to the headset or earpieces and wires, or both. Replacement of such damaged parts can be costly.

Additionally, most users of portable electronic sound and communication devices are required to carry at least three separate pieces: a carrying case, a headset or earpieces, and the mobile sound or communication device. Locating and carrying three separate pieces is often frustrating and time consuming. Additionally, certain scientific studies have suggested that the extended use of cell phone or blue tooth wireless headset devices, when the cell phone or blue tooth wireless headset device is placed directly adjacent to one's ear, can result in undesirable health problems, such as tumors and cancer, not the least of which is known as cell phone elbow. Some users of blue tooth wireless headset devices or cell phones in close proximity to the ear have also reported increased headaches.

Presently available recharging units and carrying cases for portable sound and communication devices include assemblies to hold earpiece cables around a spool attached to the carrying case or recharging unit. See, for example, U.S. Patent Publications No. 2005/0116684; 2005/0255898; and 2007/0293288. The prior art also includes stand alone headset cable reel assemblies that attach to the cable itself. These devices add yet another separate component for a user of a portable sound or communication device to deal with. For example, see Patent Publication No. 2001/0035242.

None of the aforesaid prior mobile electronic devices provide a combined integral extendable and retractable earpiece cable reel assembly that is formed as part of a removable casing and platform assembly for a portable sound or communication device. Furthermore, none of the aforesaid prior mobile electronic devices provide a combined integral extendable and retractable earpiece cable reel assembly platform for a casing attachment that is interchangeable between various mobile electronic devices, without having to buy a separate earpiece cable reel assembly for each mobile electronic device with different dimensions.

It is a primary object of the present invention to provide a combined integral extendable and retractable earpiece cable reel platform assembly that removably attaches to a mobile electronic device.

It is a further object of the present invention to provide a combined extendable and retractable earpiece cable reel assembly that is integrally formed as part of a removable platform assembly for a mobile electronic device.

It is yet another object of the present invention to provide a combined extendable and retractable earpiece cable reel platform assembly that is removably attached to a casing attachment, the platform being interchangeable between various mobile electronic devices having a casing assembly with a corresponding docking footprint.

It is yet another object of the present invention to provide a combined integral extendable and retractable earpiece cable reel platform assembly that can remain attached to the mobile electronic device when not in use, simply by disconnecting the connector plug from the audio output of the mobile electronic device and placing the connector plug in a plug holding area of the platform.

It is yet another object of the present invention to provide a combined extendable and retractable earpiece cable reel platform assembly that retains the earpieces and associated wires and cables securely within the assembly, thereby preventing any damage to the assembly.

It is yet another object of the present invention to provide a combined integral extendable and retractable earpiece cable reel platform assembly that is one integral part, reducing the number of pieces the user must carry.

It is yet another object of the present disclosure to provide a combined integral extendable and retractable earpiece cable reel platform assembly and casing assembly that are cost effective, requiring the user to only buy one complete assembly that attaches to multiple mobile electronic devices.

SUMMARY OF THE INVENTION

The present invention, in one embodiment, provides an earpiece cable reel assembly that is integrally formed as part of a platform, where the platform is interchangeably attached to the protective casing assembly of a mobile communications device. The platform is removably attachable to any protective casing assembly equipped with the docking footprint of the present invention. The cable reel assembly includes earpieces and the cable reel housing and earpieces are nested in cavities formed in the platform. The cable reel assembly can also include an inline microphone, which is situated to stop retraction of the cable at the point of the inline microphone. Retraction of the cable is facilitated by pressing a rewind button on the cable reel housing. The platform also includes a jack plug holding area, where the user can disconnect the jack plug from the audio output port, connect the jack plug to the jack plug holding area and use the mobile communication device's actual speakers and microphone without disconnecting the entire platform from the protective casing assembly. A clasp assembly for attaching the mobile communication device to wearing apparel, a back pack, or the like, supported by the user may be removably attached to the cable reel housing.

BRIEF DESCRIPTION OF THE DRAWINGS

The following figures are included to better illustrate the embodiments of the devices and techniques of the present invention. In these figures, like numerals represent like features in the several views. It is to be noted that these figures, illustrating the several views of the present invention, unless stated to be otherwise, are not necessarily drawn to scale. Nor are the contents of the drawings to be considered as limiting the scope of the present invention as defined in the claims.

FIG. 2b is a perspective detail view showing the earpieces, earpiece cables, an inline microphone of the cable reel platform assembly partially withdrawn from the cable reel housing of the invention illustrated in FIGS. 1 and 2a.

FIG. 7b is a perspective end view of the cable reel platform assembly and casing assembly of FIG. 7a.

FIG. 8a is a front plan view of the casing assembly of the present invention.

FIG. 8b is a cross section view of the casing assembly of FIG. 8a, taken along line 8b-8b in FIG. 8a.

FIG. 8c is a view of detail A of FIG. 8b, illustrating an attachment prong of the casing assembly of FIGS. 8a, b for attachment of the cable reel platform assembly to the casing assembly.

FIG. 11b is a perspective detail view of the pliable earpiece retainer that fits into the earpiece receiving cavity of FIG. 11a.

The illustrated embodiment of the present invention is ancillary to the mobile communication and sound device and earpiece cable reel housing combinations described and claimed in the inventor's co-pending patent application Ser. No. 12/629,220, filed Dec. 2, 2009, titled "Attachable Extendable and Retractable Earpiece Assembly for Mobile Communication and Sound Devices," Ser. No. 12/708,695, filed Feb. 10, 2010, titled "Attachable Extendable and Retractable Earpiece and Protective Casing Assembly for Mobile Communication and Sound Devices," and Ser. No. 13/369,580, filed Jun. 9, 2011, titled "Improved Attachable Extendable and Retractable Earpiece Cable Assembly for Mobile Communication and Sound Devices," the contents of which applications are incorporated herein by reference.

DETAILED DESCRIPTION OF THE ILLUSTRATED EMBODIMENT

Figures 1, 2A:
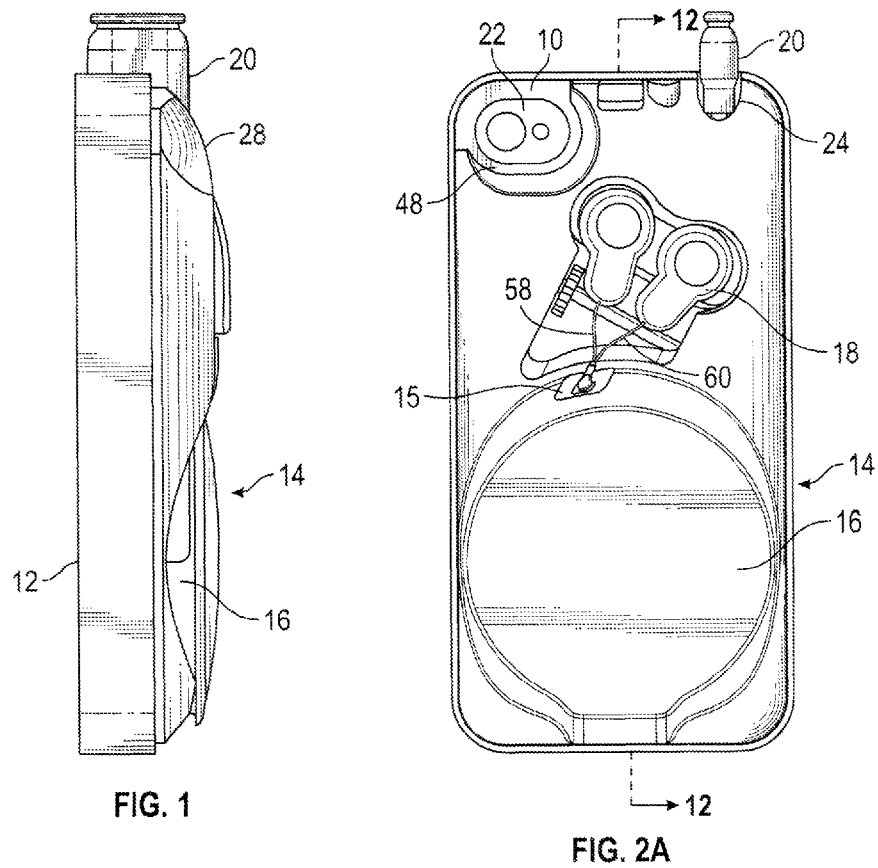
FIG. 1 depicts a side view of an illustrated embodiment of the cable reel platform and casing assemblies of the present invention.
FIG. 2a depicts a back view of the cable reel platform and casing assemblies of FIG. 1.
Figure 2B:
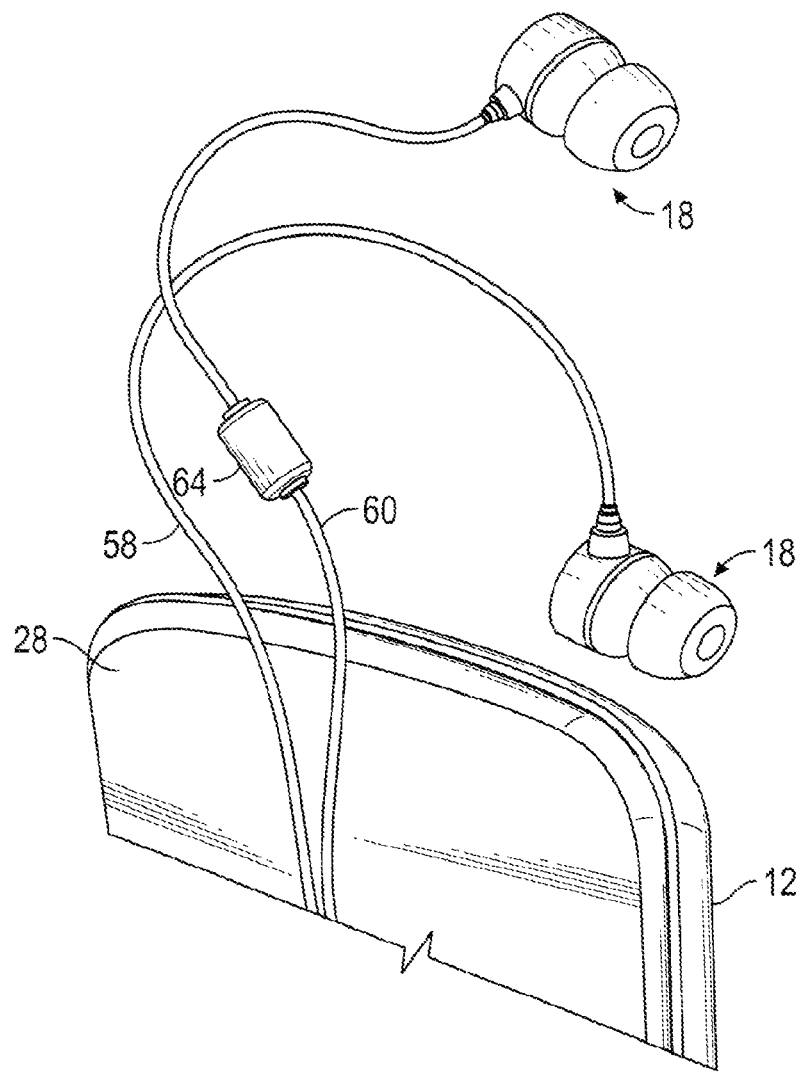
Figure 11A:
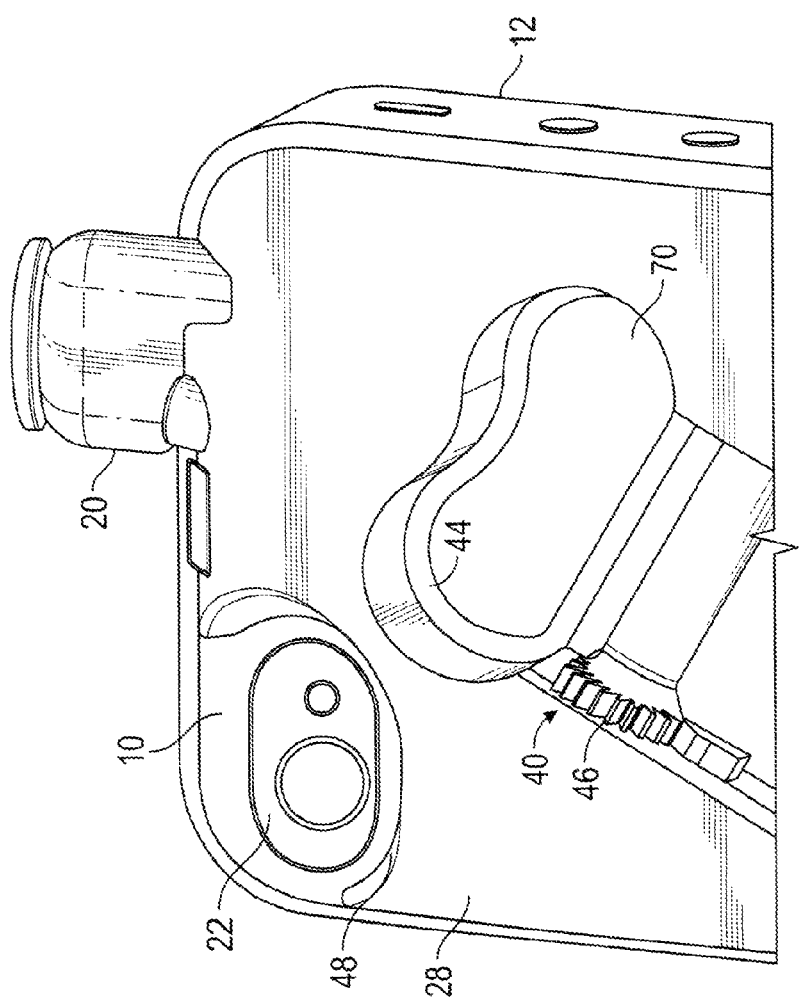
FIG. 11a is a detail perspective view of the top portion of the cable reel platform assembly of the present invention, showing the contoured cavity for receiving and releasably engaging the earpiece connected to the cables.
Figure 11B:
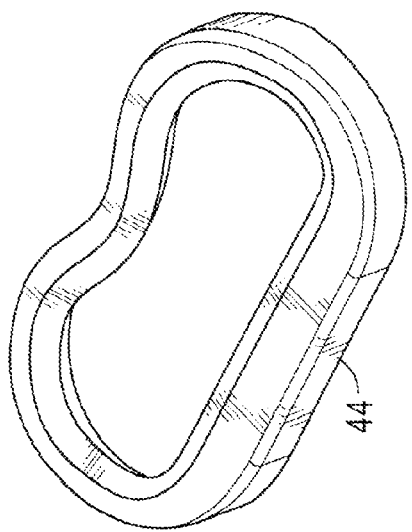
Figure 13:
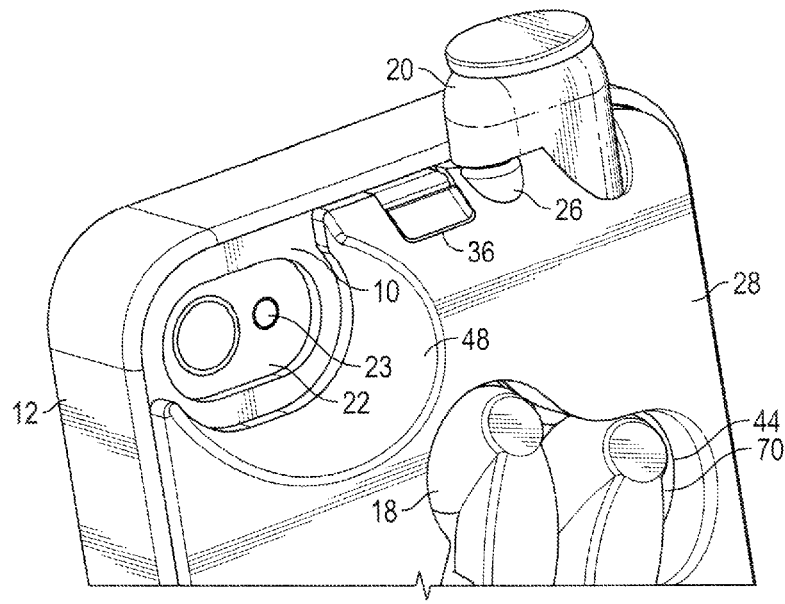
FIG. 13 depicts the camera and flash clearance port of the cable reel platform assembly of the present invention.

An illustrated embodiment of the present invention provides an interchangeable, extendable and retractable earpiece or headset cable assembly in a reel housing 16, where the reel housing 16 is permanently fastened to a platform assembly 28, and the platform assembly 28 is removably fixed to a casing assembly 12 that partially encases a mobile electronic communication or sound device 10 (FIG. 11a). Referring to FIGS. 1 and 2, the side of an electronic mobile communications or sound device 10 opposite the display screen (not shown) is encapsulated in a casing assembly 12, which includes an aperture 13 (FIG. 3b) for input and output ports, an audio output port 24 (FIGS. 4, 5) and access to a camera lens 22 (FIG. 2). The camera lens 22 requires a clearance 48 around the camera lens 22 and flash 23 to meet different mobile electronic devices' design requirements, as shown in FIG. 13. The cable reel winder assembly 14 (FIG. 14) and platform assembly 28 are removably fixed to the casing assembly 12, and the platform assembly 28 is interchangeable between other mobile electronic devices 10. The cable reel winder assembly 14 includes the reel housing 14, earpieces 18 connected to cables 58, 60 (FIG. 2a), and audio output connector plug 20. The winder assembly 14 also includes a rewind button 38 for the cable reel, shown in FIGS. 7a, 7b. The cables 58, 60 are adapted to be wound around and retracted from the winder assembly 14, as will be explained.

Earpiece cables 58, 60 extend from the reel located inside housing 16 through aperture 15 in the reel housing 16. The winder assembly 14 stops earpiece cables 58, 60 from retracting onto the winder reel in reel housing 16 at the point of the inline microphone 64 (FIG. 2b), which has a strain relief, and cannot retract into the winder assembly 14. The earpiece cables 58, 60 will wind 320 degrees around the outside area of the winder assembly 14, providing an easy way to manage the length of the cable between the microphone 64 and the earpieces 18, which requires some distance between the microphone and earpiece in order to prevent acoustic feedback and work correctly.

The platform 28 can be attached to a multitude of devices 10, such as a mobile phone, pad device, and tablet, for example. The platform assembly 28 can be removed from the device 10 when the user wants to use the device 10 without the winder assembly 14 attached, and when the user wants to move the winder platform assembly 28 from one mobile device 10 to another mobile device 10. The casing assembly 12 includes a docking footprint, which is the area that allows attachment of the winder assembly 14 and platform assembly 28 to a casing assembly 12. The user would only need to buy one platform 28 with the winder assembly 14, and a separate casing assembly 12 for each mobile electronic device 10 with which the user wants to use the winder assembly 14.

Figure 3B:
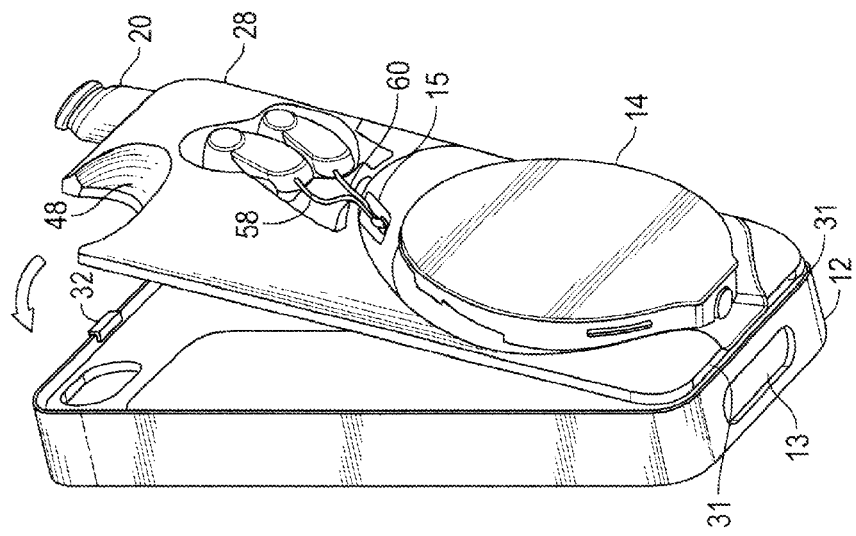
FIGS. 3a-d depict the method of connecting the cable reel platform assembly of FIGS. 1 and 2 to a corresponding casing assembly for a mobile electronic device.
Figure 3A:
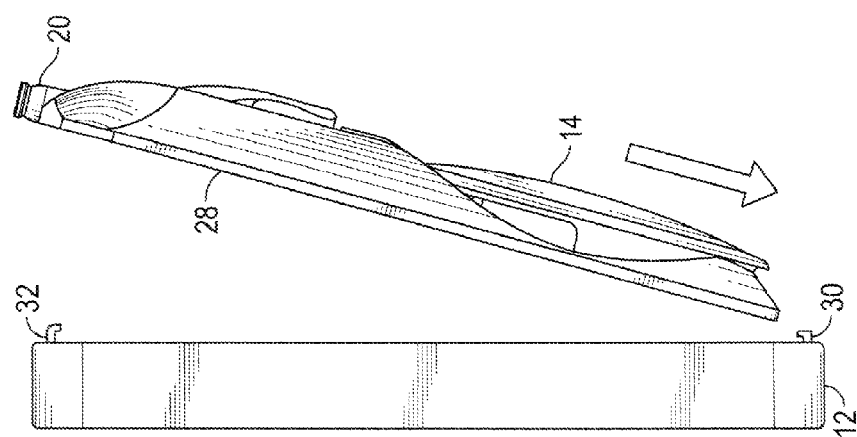
Figure 3D:
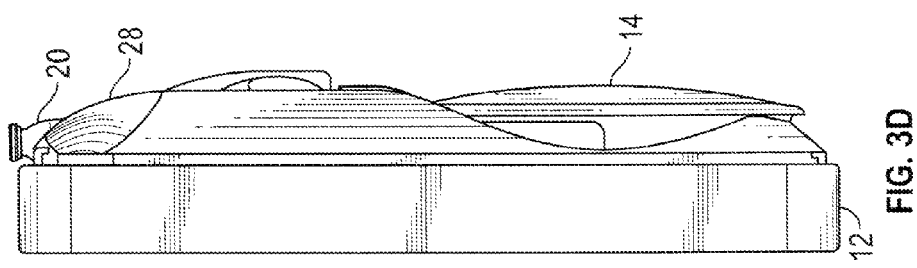
Figure 3C:
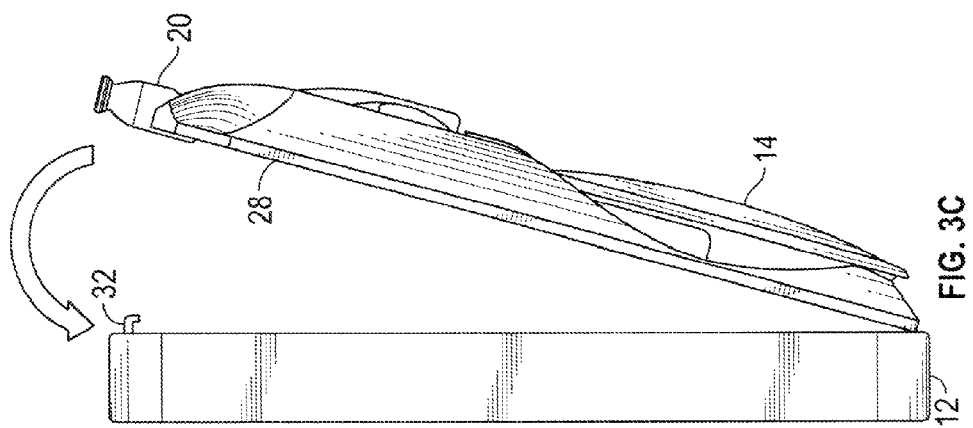

FIGS. 3a-d depict the method of attaching the platform assembly 28 to the casing assembly 12 of the mobile electronic device 10. The user aligns and engages the platform assembly 28 and winder assembly 14 with the hooks 30 on the bottom of the casing assembly 12, shown in FIG. 3a. Once slots 31 on the bottom of the platform assembly 28 are engaged with the hooks 30 (FIG. 7), the user rotates the platform assembly 28 and winder assembly 14 to snap into place with hook 32 on the top of the casing assembly 12, as shown in FIGS. 3b and 3c. An audible click, when a connection is made between the platform assembly 28 and the top hook 32, will assure the user that a secure connection has been made between casing assembly 12 and platform assembly 28. The platform assembly 28 includes a button 34 (FIGS. 6a, b), with a spring loaded mechanism 36, shown in FIG. 6b, that is simple and easy to use. The button 34 engages the top hook 32 on the casing assembly 12 and platform assembly 28 can be disengaged from casing assembly 12 by applying a downward force on the button 34.

Figure 4:
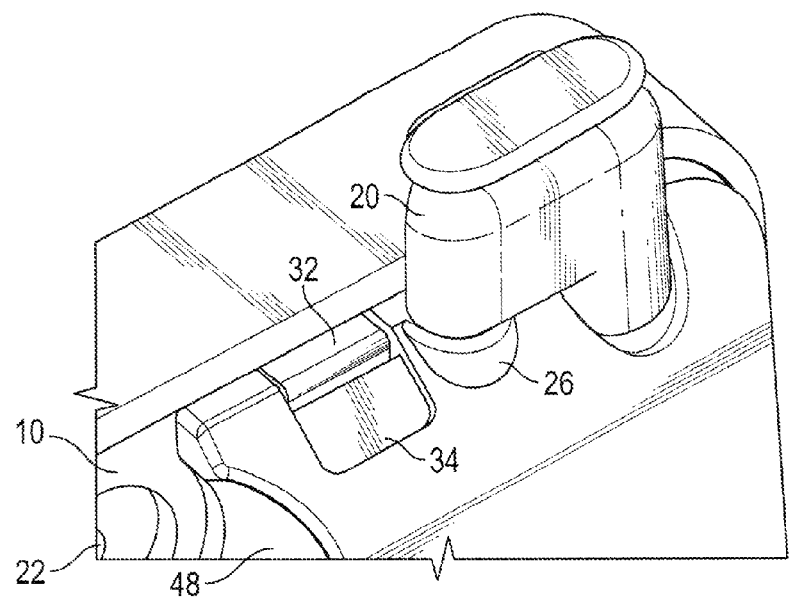
FIG. 4 depicts the connector plug of the cable reel and casing assembly of FIGS. 1 and 2 connected to the plug holding area of the cable reel assembly.
Figure 5:
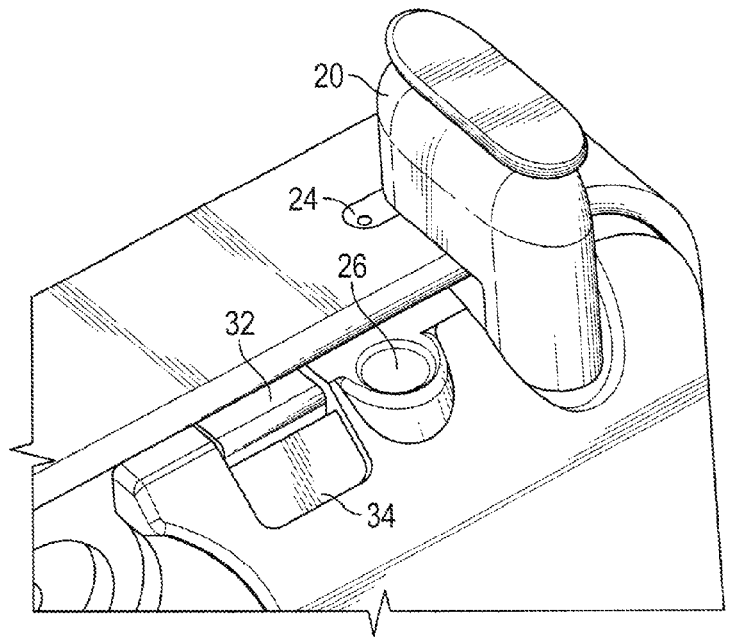
FIG. 5 depicts the connector plug of the cable reel platform assembly and casing assemblies of FIG. 4 connected to the audio output port of a mobile electronic device.

Referring to FIGS. 4 and 5, audio connector plug 20 is located on the platform assembly 28 and extends upwardly to connect to the audio output port 24 of mobile communication device 10, shown in FIG. 5, when in use. When the prong 21 (FIG. 14) of connector plug 20, which is electrically connected to the winder assembly 14, is plugged into the audio output port of mobile electronic device 10, the prong 21 makes a mechanical connection to the speakers of the device 10 and all calls will be automatically routed to the earpieces 18. The user can keep the winder assembly 14 attached to the device 10, but still use the actual device's 10 speaker and microphone, by unplugging the connector plug 20 from the device 10, rotating the plug 20 ninety degrees and inserting the contact prong 21 of connector plug 20 into a plug holding slot 26, shown in FIG. 4, to safely hold the connector plug in a secure position to prevent breakage of the connector plug 20 or the wires connected to the connection plug.

Figure 6A:
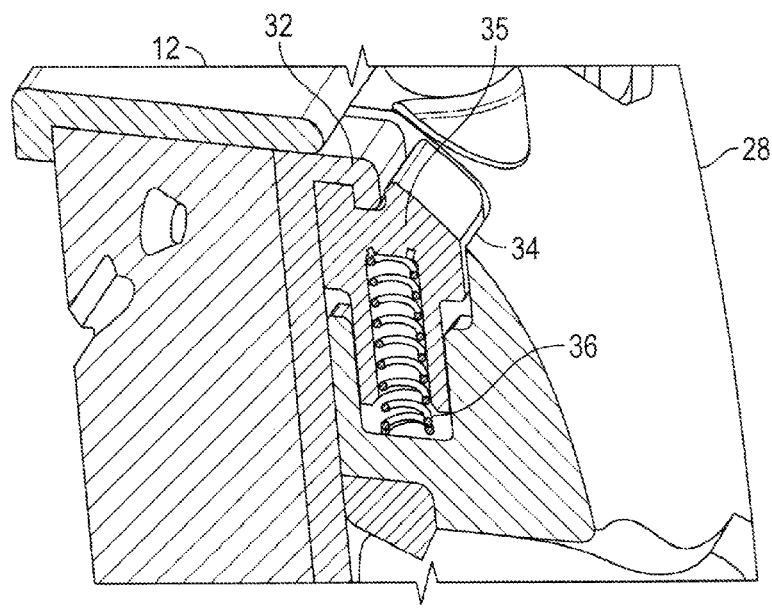
FIG. 6a is a partial sectional view of a spring loaded release mechanism of the cable reel platform and casing assembly of the present invention.
Figure 6B:
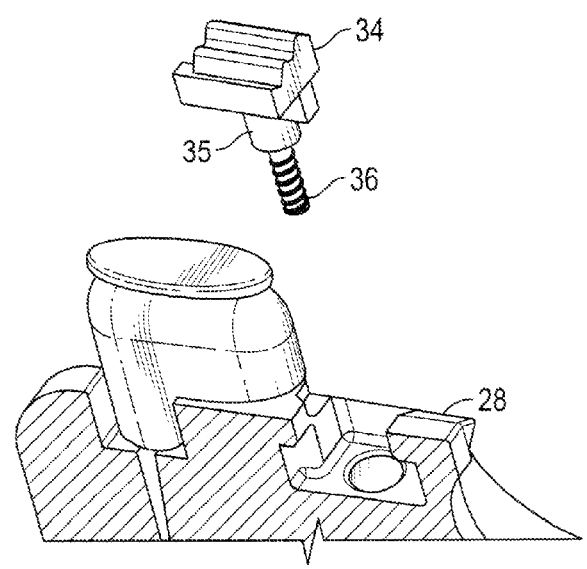
FIG. 6b is an exploded detail view of the latch and latch receptacle forming part of the attachment and release mechanism between the platform assembly and the casing assembly of the present invention.

Referring to FIGS. 6a and b, the platform assembly 28 includes a spring loaded release mechanism 35 that makes it simple and easy to attach and remove the platform assembly 28 to and from casing assembly 12. The spring loaded release mechanism 35 includes a manually operable button 34 and a spring 36. When the user aligns the platform 28 to install the platform onto the casing assembly 12, the button 34 is depressed and the mechanism engages with top hook 32 of casing assembly 12. When the user wants to remove the winder assembly, the user depresses the button 34, compressing spring 36, and releases the platform assembly 28 from hook 32.

Figure 7A:
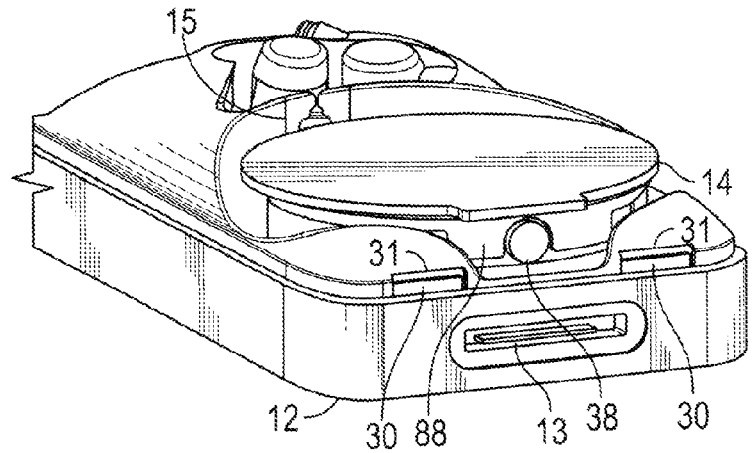
FIG. 7a is a perspective end view of the cable reel platform assembly and casing assembly of the present invention showing the location of the reel rewind button.
Figure 7B:
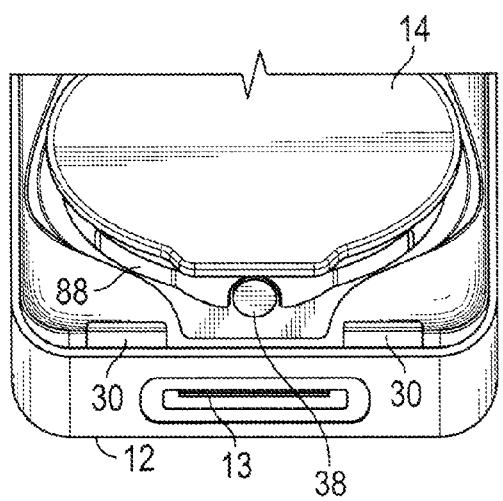
Figure 7C:
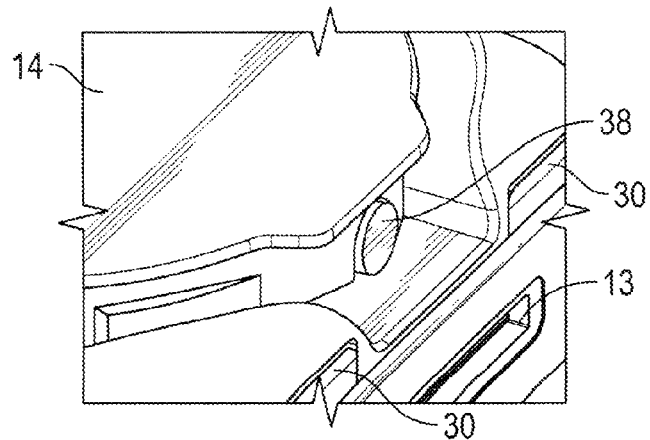
FIG. 7c is a detail view of the reel rewind button location of the reel assembly of FIGS. 7a and 7b.

FIGS. 7a, b, c depict the rewind button 38 on the reel housing 16. The user depresses rewind button 38 to retract earpiece cables 58, 60 around winder assembly 14 and inside reel housing 16, when earpieces 18 are not in use. As stated previously, the cables 58, 60 will wind 320 degrees around the outside surface of winder assembly 14 before the cables come into contact with the reel of the winder assembly 14, which prevents the microphone 64 (FIG. 2b) from being damaged by the reel mechanism of the winder.

Wire retainer 42 (FIG. 10), in the illustrated embodiment, includes a first aperture 43 and a second aperture 45 extending vertically through retainer 42, and a slot 47 connecting apertures 43 and 45. Apertures 43 and 45 are adapted to guide earpiece cables 58, 60 into and out of reel housing 16. Slot 47 applies a slight amount of friction to hold the cables 58, 60 in place when extended from reel housing 16. A flange 49 extends around the base of wire retainer 42 to allow the wire retainer to be held in place in aperture 15 of reel housing 16 (FIG. 9).

Figure 9:
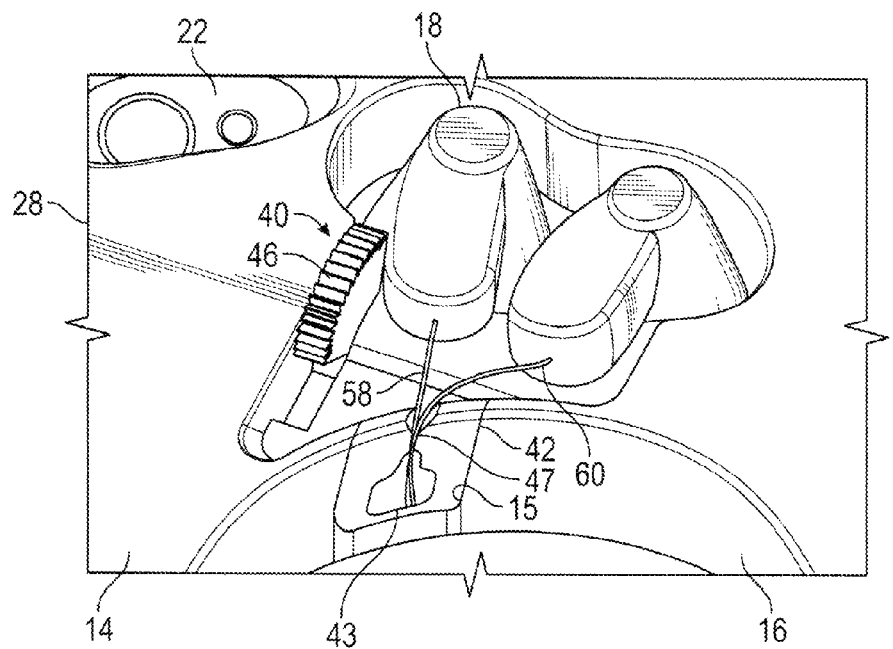
FIG. 9 is a detail view of the earpiece release mechanism of the cable reel platform assembly of the present invention.
Figure 10:
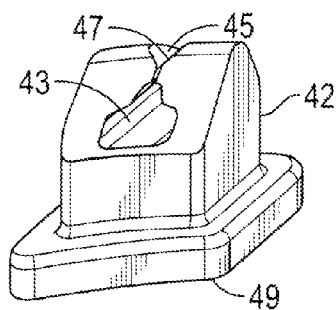
FIG. 10 is a detail perspective view of the soft rubber cable retainer piece of the cable reel platform assembly of the present invention.
Figure 12A:
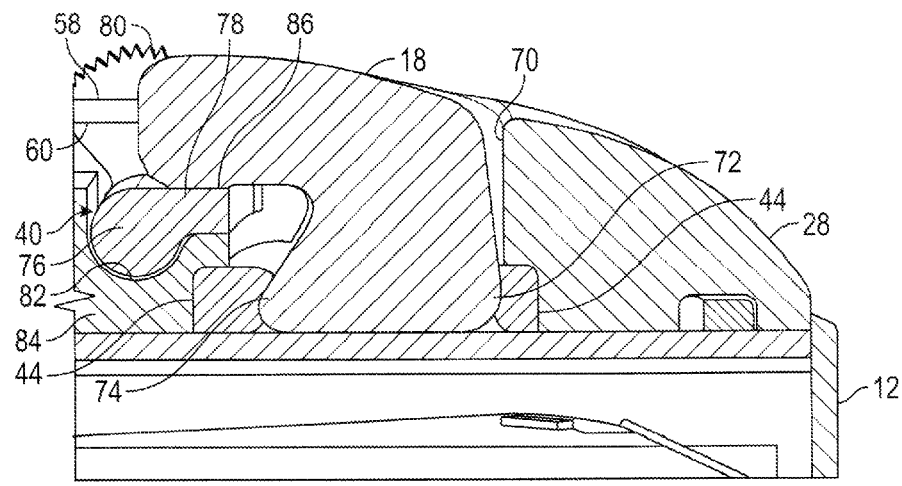
FIG. 12a is a detail sectional view of the cable reel platform assembly of the present invention, showing the earpiece release mechanism and an earpiece prior to the release of the earpiece.
Figure 12B:
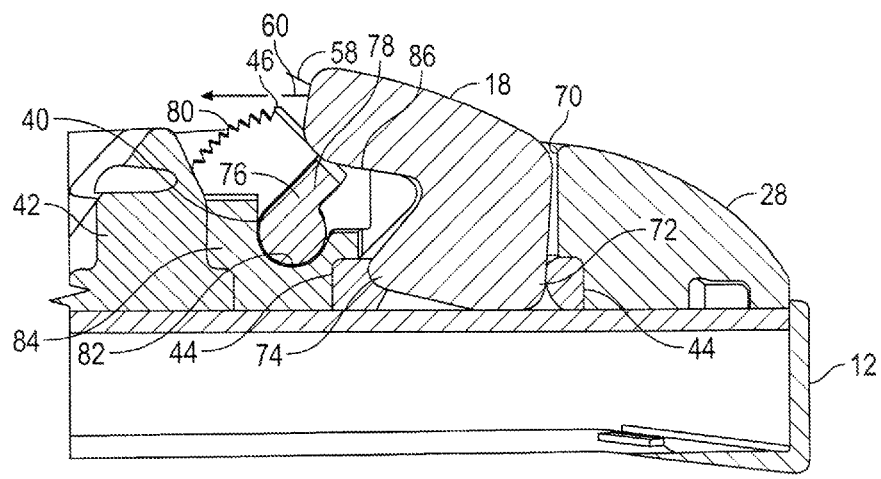
FIG. 12b is a detailed sectional view of the cable reel platform assembly of the present invention, showing the earpiece release mechanism and an earpiece being released from the cable reel platform assembly.
Figure 12C:
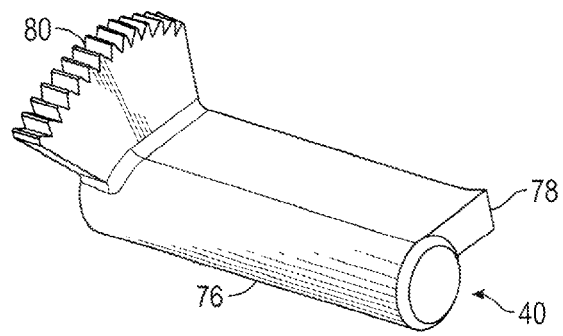
FIG. 12c is a detail perspective view of the rotating earpiece release shaft and flange of the present invention.

FIGS. 9, 11a-b, and 12a-c, depict the details of the unique earpiece 18 holding assembly 40 mounted on platform 28. A cavity 70 in a somewhat "goggle" shape is formed in the surface of platform 28, and a pliable earpiece retainer 44 (FIG. 11b), made of soft rubber, soft plastic, or other suitable material, is disposed in and lines the walls of cavity 70. The earpiece retainer 44 is designed to hold each earpiece 18 in cavity 70, as shown in FIGS. 9 and 12a. As seen in FIG. 12a, when placed in cavity 70, a forward end 72 of each earpiece 18 engages and compresses retainer 44. A rear end 74 of each earpiece 18 also engages and compresses retainer 44, and each earpiece 18 is snugly, but removably secured in cavity 70 when the earpieces are not being used.

Referring to FIGS. 12a, b, c, the release assembly 40 includes a partially round shaft 76 having a flange 78 extending outward from the shaft, and a ridged or knurled wheel segment 80 attached to shaft 76. As seen in FIGS. 12a and b, shaft 76 is lodged in a partially cylindrical slot 82. Slot 82 is part of a bracket 84 attached to platform 28. When earpieces 18 are lodged in cavity 70 by retainer 44, flange 78 extends beneath a base portion 86 of each earpiece 18, as seen in FIG. 12a.

To dislodge earpieces 18 from cavity 70 and from platform 28, wheel segment 80 is manually engaged by the user, and rotated counterclockwise as viewed in FIGS. 12a and b. Flange 78 applies a lifting force to the base portion 86 of each earpiece 18, thus dislodging each earpiece from retainer 44. The user then grasps the earpieces 18 and removes them from cavity 70. The user then pulls the earpieces 18 from platform 28 such that earpiece cables 58, 60 are unreeled and withdrawn from the apertures 43, 45 in wire retainer 42 (FIG. 9). The user then inserts the earpieces 18 in each respective ear and the earpiece cables 58, 60 are held in place by the rewind reel mechanism inside reel housing 16, as is known in the art. At the same time, the audio connector plug 20 is lifted upward such that the connector prong (not shown) is withdrawn from plug holding slot 26 and inserted into audio output port 24 of the mobile communication device 10 (FIG. 5). In the illustrated embodiment, the connector plug 20 is L-shaped, such that when removing the prong of the connector plug from the audio output port 2, the friction force of the audio output port is isolated from the wire connection between the connector plug 20 and the winding reel inside of cable housing 16 of platform assembly 28. This prevents premature fraying of the audio input wire (not shown) of platform 28, and provides a longer useful life for the platform assembly 28.

When the user is finished listening to the audio output of the mobile communication device 10, the earpieces 18 are removed from the user's ears, and the earpiece cables 58, 60 are retracted into reel housing 16 by pushing release button 28 (FIG. 7a). The winding mechanism (not shown) retracts the cables 58, 60 into the reel housing 16, as is known in the art. A 320 degree length of the cables 58, 60 is wound around the outside surface 88 of the cable reel winder assembly 14 (FIGS. 7a, b) before entering the reel housing 16, thus preventing microphone 64 from being wound around the cable reel inside reel housing 16. Each earpiece 16 is then inserted into cavity 70, rotating flange 78 clockwise into position beneath the rear end 74 of each earpiece. The earpieces 18 are then firmly engaged by earpiece retainer 44 and held in place on platform 28 until the user withdraws the earpieces, as previously explained. Upon cessation of use of the mobile communication device 10, L-shaped connector plug 20 is lifted upward and prong 21 is removed from audio output port 24. Plug 20 is then rotated 90 degrees, and the prong 21 is located over plug holding slot 26. Finger pressure is then applied to connector plug 20, forcing the plug 20 downward, and inserting the prong 21 into plug holding slot 26 (FIG. 4). The connector plug 20 and its associated prong 21 are then held securely until the mobile communication device 10 is used again.

FIGS. 9-12 depict the earpiece 18 manual release 40 located on the platform Assembly 28. The earpiece 18 cables 58, 60 are held in place and enter the reel housing 16 of the winder assembly 14 by a wire retainer element 42, shown in detail in FIG. 10, made from soft rubber or other suitable pliable material. FIG. 15 is a detail view of the upper portion of platform 28 that includes cut-out clearance 48 that is adapted to provide a clear opening for the camera lens 22 and flash 23 of the mobile communication device 10.

Figure 14:
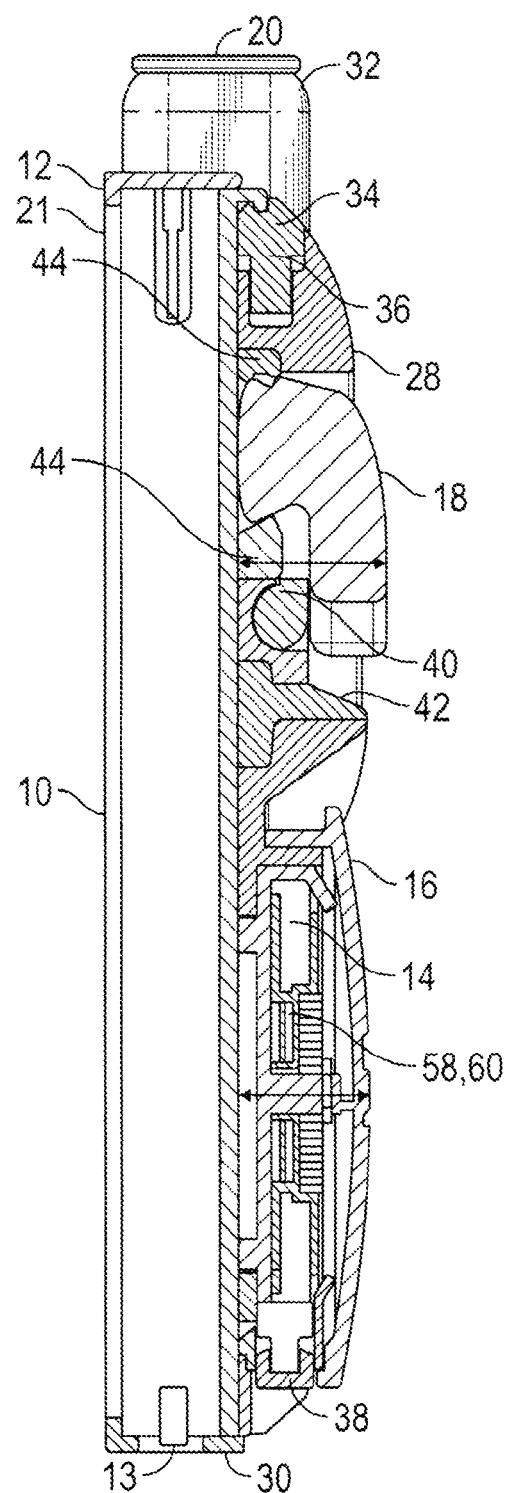
FIG. 14 depicts a cross-sectional side view of the casing assembly and cable reel platform assembly of the present invention, taken along line A-A of FIG. 2.

A cross-sectional side view of the platform 28 and casing assembly 12 is depicted in FIG. 14. The casing assembly 12, sometimes referred to as a "skin", includes apertures 13 for the input and output ports, the audio output port 24, and access to a camera lens 22 and flash 23 of the mobile communications device 10. The casing assembly 12 also includes top hook 32 and bottom hooks 30, which securely connect the platform 28 to the casing assembly 12, as previously described. The platform 28 includes the connector plug 20 and plug holding area 26, the spring loaded release button 38 and mechanism 36 (not shown), the camera clearance 48 (not shown), the earpieces 18, the earpiece retainer 44, the earpiece release mechanism 40 with a ridged wheel 46 (not shown), the wire retainer 42, the winder assembly 14, the reel housing 16 and the rewind button 38.

In operation of the embodiment of the invention shown in FIGS. 1-14, the user installs the casing assembly 12 to a mobile electronic device 10. Once the casing assembly 12 has been installed, the user aligns and engages the platform 28 with hooks 30 on the bottom of the casing assembly 12, as described previously. Once hooks 30 are engaged with the platform 28, the user rotates the platform 28 towards the casing assembly 12 and snaps the opposite end of the platform 28 into place with hook 32 on the top of the casing assembly 12. To remove the platform 28, the user applies a downward force onto button 34 and the platform 28 will disengage from hook 32.

The user then connects the connector plug 20 to the audio output port on the mobile electronic device 10. Alternatively, the user can connect the connector plug 20 to the plug holding area 26 to use the mobile electronic device's 10 own speaker and microphone. When the user is finished using the earphone and/or in-line microphone 64, the user presses the rewind button 38 and the cables 58, 60 will be retracted into the winder assembly 14 up to the point of the in-line microphone 64, as previously described.

The foregoing description of the illustrated embodiment of the invention have been presented for purposes of illustration and description, and are not intended to be exhaustive or to limit the invention to the precise forms disclosed. The description was selected to best explain the principles of the invention and practical application of these principles to enable others skilled in the art to best utilize the invention in various embodiments and various modifications as are suited to the particular use contemplated. It is intended that the scope of the invention not be limited by the specification, but be defined by the claims set forth below.

What is claimed is:

1. An interchangeable, extendable and retractable earpiece cable assembly for a mobile electronic device having an audio output port and at least one electronic screen display, comprising:
  a. a protective casing assembly adapted to be attached to said mobile electronic device, said casing assembly having certain internal dimensions substantially the same as certain external dimensions of said mobile electronic device and having an aperture in a front portion for the electronic screen display;
  b. a platform assembly removably attached to a rear portion of said casing assembly;
  c. a cable reel housing mounted to a rear of said platform assembly;
  d. the protective casing assembly, platform assembly, and cable reel housing provide a single integrated assembly ready for use when assembled together;
  e. an extendable and retractable earpiece cable assembly located in said cable reel housing;
  f. said extendable and retractable earpiece cable assembly including at least one earpiece cable retractably extendable from said cable reel housing, and a reel mechanism around which said at least one earpiece cable is removably wound, said at least one cable electrically connected to at least one earpiece;
  g. said protective casing assembly including a docking footprint, said docking footprint adapted to removably receive said platform assembly; and
  h. said platform assembly including a releasable latch having a spring loaded mechanism, said releasable latch adapted to releasably engage a hook on a top of the protective casing assembly.

2. The cable assembly of claim 1, wherein:
  a chamber is formed in said cable reel housing and a rotatable reel is disposed in said chamber;
  said at least one cable wound around said reel in a first position, said at least one cable extending from said reel in said chamber and through an aperture in the reel housing to a location exterior of said reel housing in a second position.

3. The cable assembly of claim 2, wherein:
  a second end of said at least one cable is electrically connected to an electrical jack plug, said electrical jack plug adapted to be electrically connected to said audio output port of said mobile electronic device.

4. The cable assembly of claim 2, wherein:
  said reel allowing said at least one cable to extend outward in a linear direction from said reel housing through said aperture upon the application of a manual tension force to said at least one cable.

5. The cable assembly of claim 4, wherein:
the application of a tension force to the extended at least one cable actuates said reel to rewind said at least one cable around said reel.

6. The cable reel assembly of claim 4, wherein:
the dimensions of said aperture are adapted to prevent said at least one earpiece from passing through said aperture into said chamber.

7. The cable assembly of claim 2, wherein:
a second end of said at least one cable is electrically connected to an electrical jack plug, said electrical jack plug adapted to be connected to a jack plug holding aperture of said platform in a first position;
said jack plug adapted to be connected to said audio output port of said mobile electronic device in a second position.

8. The cable assembly of claim 6, wherein:
said at least one cable is electrically connected to an inline microphone, said microphone preventing said cable from retracting into said cable reel housing at the point of the inline microphone.

9. The cable assembly of claim 8, wherein said at least one earpiece is a set distance from said microphone.

10. The cable assembly of claim 1, wherein the protective casing assembly includes at least one hook on the top and at least one hook on a bottom of said protective casing assembly, said hooks adapted to engage said platform assembly and attach said platform assembly to said protective casing assembly.

11. The cable assembly of claim 1, wherein the platform includes a connector plug, said connector plug adapted to make an electrical connection with the audio output port of the mobile electronic device.

12. The cable assembly of claim 11, wherein the platform assembly includes an aperture, said aperture adapted to accept the connector plug when the connector plug is not connected to the audio port.

13. The cable assembly of claim 1, wherein the platform assembly includes an earpiece retainer, said earpiece retainer adapted to removably accept and retain the at least one earpiece.

14. The cable assembly of claim 1, wherein at least one of the platform assembly and the protective casing assembly includes a plurality of apertures, said apertures adapted to allow access to at least one of an input port, the audio output port, and a camera lens of said mobile electronic device.

15. An interchangeable, extendable and retractable earpiece cable assembly for a mobile electronic communication or sound device having an audio output port, comprising:
  a. a protective casing assembly adapted to be attached to said mobile communication or sound device, said casing assembly having certain internal dimensions substantially the same as certain external dimensions of said mobile electronic communication or sound device;
  b. a platform assembly removably attached to a portion of said casing assembly;
  c. a cable reel housing mounted to said platform assembly;
  d. at least one cable retractably extending from said cable reel housing, said at least one cable electrically connected to at least one earpiece;
  e. wherein the platform assembly includes an earpiece retainer, said earpiece retainer adapted to removably accept and retain the at least one earpiece; and
  f. wherein the platform assembly includes a release mechanism associated with said at least one earpiece, said release mechanism adapted to release the at least one earpiece from said earpiece retainer.

16. The cable assembly of claim 15, wherein:
  a. a chamber is formed in said cable reel housing and a rotatable reel is disposed in said chamber;
  b. said at least one cable is coiled around said reel in a first position, said at least one cable extending from said reel in said chamber and through an aperture in the cable reel housing to a location exterior of said reel housing in a second position; and
  c. wherein the platform assembly includes a cable retainer located in said aperture, said cable retainer adapted to guide the at least one cable into and out of said chamber.

17. The cable assembly of claim 16, wherein the cable reel housing includes a rewind button, said rewind button initiating retraction of said at least one cable around said reel.

* * * * *